(No Model.)

C. B. HOBRON.
AXLE BOX.

No. 410,590. Patented Sept. 10, 1889.

Witnesses
H. C. Newman,
E. S. Newman.

Inventor
Charles B. Hobron,
By his Attorneys
Baldwin, Davidson & Wight

UNITED STATES PATENT OFFICE.

CHARLES B. HOBRON, OF BOERNE, TEXAS.

AXLE-BOX.

SPECIFICATION forming part of Letters Patent No. 410,590, dated September 10, 1889.

Application filed May 28, 1889. Serial No. 312,364. (No model.)

*To all whom it may concern:*

Be it known that I, CHARLES B. HOBRON, a citizen of the United States, residing in Boerne, county of Kendall, and State of Texas, have invented certain new and useful Improvements in Axle-Boxes, of which the following is a specification.

My invention relates to that class of axle-boxes in which anti-friction devices are employed for enabling the wheel to revolve on the axle with as little friction and wear as possible.

My invention consists in providing anti-friction rods or rollers arranged between the axle and the vehicle-hub, and held in place in an improved manner, as will be hereinafter described.

Figure 1:
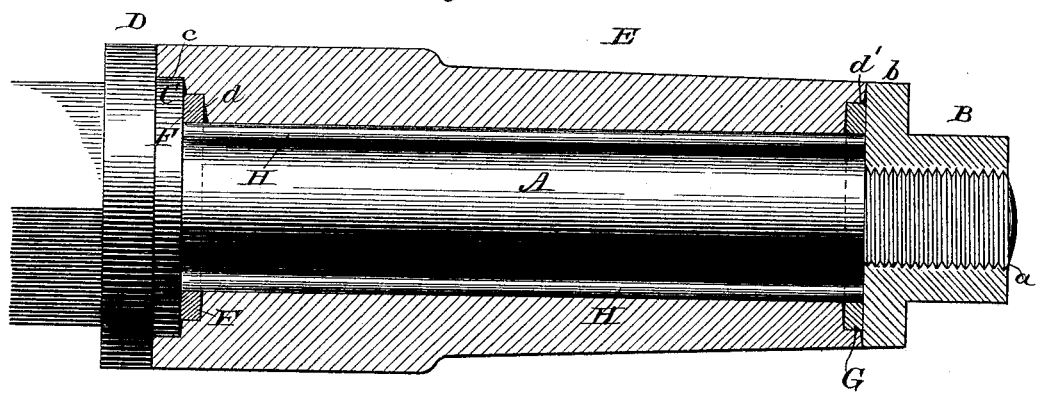
Figure 2:
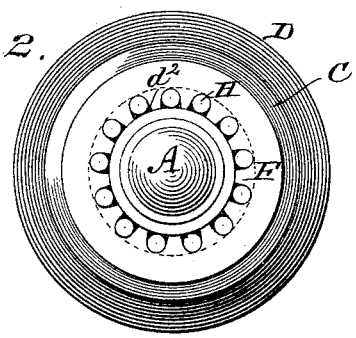
Figure 4:
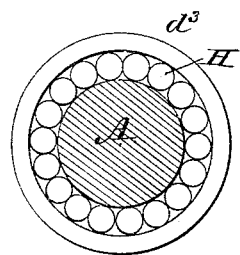
Figure 3:
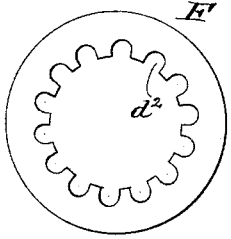
Figure 5:
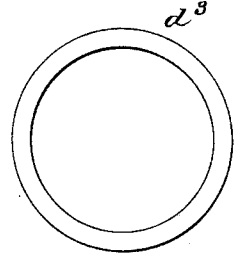

In the accompanying drawings, Figure 1 is a side elevation of one end of an axle, showing a vehicle-hub or axle-box, the end nut of the axle, and the end washer or ring in section, and showing the anti-friction rollers or rods in elevation; Fig. 2, an end view of the axle with the nut, hub, and front washer removed. Fig. 3 is a detail view of one of the rings or washers used for holding the anti-friction rollers or rods in position. Fig. 4 is a cross-section through an axle, showing a modified way of arranging the rollers thereon. Fig. 5 is a detail view of one of the rings which may be used for holding the rods or rollers in place.

The journal end A of the axle is made as usual, and is provided on its outer end with a removable nut B, of usual construction, which works on the screw-threaded end $a$ of the axle A.

The inner end of the axle A is provided with a flange or collar C, and inside of the flange or collar C is formed a collar D, of larger diameter than the flange or collar C.

The hub E is made to conform to the shape of the axle and its flanges or collars. At its outer end its surface is flush with the surface $b$ of the nut B, and at its inner end is flush with the surface of the collar D. At $c$ the hub is cut away to snugly fit over the collar C. The central bore of the hub is somewhat larger in diameter than the axle A, for the purpose presently to be described.

At one end, on its inner side, the hub is formed with recesses $d$ and $d'$ to accommodate rings or washers F and G, the ring or washer F lying in the recess $d$, and the ring or washer G lying in the recess $d'$. Anti-friction rods or rollers H extend from the inner end of the axle A—that is, from the collar C to the outer end of the axle, close to the inner face of the nut B. At their ends the rods are embraced by the rings or washers F and G, so that they are held in place, but are free to turn and yield when the hub revolves about the axle.

As shown in Figs. 2 and 3, the rings F and G are formed on their inner faces with recesses $d^2$, in which the rods fit. By this construction the rods or rollers are kept in position separate from each other, and are allowed to turn freely without displacement.

Instead of using the form of washer or ring shown in Fig. 3, I may use a plain ring $d^3$, as shown in Figs. 4 and 5. In this case the rods should be arranged close together, so as to bear upon each other. This arrangement is shown in Fig. 4.

It will be seen that my improvements may be applied to any vehicle without material alteration of the axle. The rods extend the entire length of the journal end of the axle, and are held in place at each end by washers which are readily applied, it only being necessary to form recesses in the hub or in a supplemental axle-box to form seats for the washers. I prefer, however, to form the axle and axle-box and arrange the several parts of the bearing as herein shown and described.

The improved journal-boxes may be used equally well in railway-cars, street-cars, and other like vehicles.

I claim as of my own invention—

1. The combination, substantially as hereinbefore set forth, of the axle formed with a collar C, the axle box or hub formed with recesses $c$, $d$, and $d'$, the anti-friction rods or rollers, of the same diameter from end to end, extending the entire length of the journal end of the axle, the rings or washers at each end surrounding the ends of the rods and seated in the recesses $d$ and $d'$ in the box, and the nut on the outer end of the axle bearing against the end washer, the end of the box, and the outer ends of the rods.

2. The combination, substantially as hereinbefore set forth, of the axle, the axle box or hub, the anti-friction rods or rollers extending the entire length of the journal end of the axle, and the rings or washers formed with recesses opening inwardly for the ends of the rods and in which they are free to move.

In testimony whereof I have hereunto subscribed my name.

CHARLES B. HOBRON.

Witnesses:
R. D. SUNER,
JNO. REINHARD.